US009369732B2

(12) United States Patent
Gu et al.

(10) Patent No.: US 9,369,732 B2
(45) Date of Patent: Jun. 14, 2016

(54) LOSSLESS INTRA-PREDICTION VIDEO CODING

(71) Applicant: Google Inc., Mountain View, CA (US)

(72) Inventors: Qunshan Gu, Hayward, CA (US); Yaowu Xu, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 403 days.

(21) Appl. No.: 13/647,089

(22) Filed: Oct. 8, 2012

(65) Prior Publication Data

US 2014/0098854 A1      Apr. 10, 2014

(51) Int. Cl.
H04N 7/32         (2006.01)
H04N 19/593    (2014.01)

(52) U.S. Cl.
CPC .................................. *H04N 19/593* (2014.11)

(58) Field of Classification Search
CPC . H04N 19/124; H04N 19/147; H04N 19/176; H04N 19/593; H04N 19/61
USPC ............. 375/240.02, 240.03, 240.12, 240.13, 375/240.15, 240.16
See application file for complete search history.

(56) References Cited

U.S. PATENT DOCUMENTS

| | | |
|---|---|---|
| 5,148,269 A | 9/1992 | de Haan et al. |
| 5,150,209 A | 9/1992 | Baker et al. |
| 5,337,086 A | 8/1994 | Fujinami |
| 5,389,068 A | 2/1995 | Keck |
| 5,512,952 A | 4/1996 | Iwamura |
| 5,708,473 A | 1/1998 | Mead |
| 5,731,840 A | 3/1998 | Kikuchi et al. |
| 5,767,987 A | 6/1998 | Wolff et al. |
| 5,861,921 A | 1/1999 | Shimizu et al. |
| 5,886,742 A | 3/1999 | Hibi et al. |
| 5,916,449 A | 6/1999 | Ellwart et al. |
| 5,930,387 A | 7/1999 | Chan et al. |
| 5,956,467 A | 9/1999 | Rabbani et al. |

(Continued)

FOREIGN PATENT DOCUMENTS

| | | |
|---|---|---|
| EP | 0634873 | 1/1995 |
| EP | 1903698 | 3/2008 |

(Continued)

OTHER PUBLICATIONS

Jun-Ren Ding et al.; "Two-Layer and adaptive entropy coding algorithms for H. 264-based lossless image coding", Acoustics, Speech and Signal Processing, 2008. ICASSP 2008. IEE International conference on IEEE, Piscataway, NJ, USA Mar. 31, 2008.

(Continued)

*Primary Examiner* — Jay Patel
*Assistant Examiner* — Neil Mikeska
(74) *Attorney, Agent, or Firm* — Young Basile Hanlon & MacFarlane P.C.

(57) ABSTRACT

Blocks of a frame of a video stream can be encoded using lossless intra-prediction encoding. The compression ratio of lossless intra-prediction encoding can be improved by performing lossy encoding on the intra-predicted residual. The encoded residual is then decoded and the reconstructed residual is subtracted from the original residual. The resulting difference residual is encoded using lossless encoding and included in the output bitstream along with the lossy encoded residual, permitting the block to be decoded with no loss at a decoder.

5 Claims, 6 Drawing Sheets

(56) References Cited

U.S. PATENT DOCUMENTS

| | | | |
|---|---|---|---|
| 5,991,447 A | 11/1999 | Eifrig et al. | |
| 6,005,625 A | 12/1999 | Yokoyama | |
| 6,005,980 A | 12/1999 | Eifrig et al. | |
| 6,044,166 A | 3/2000 | Bassman et al. | |
| 6,058,211 A | 5/2000 | Bormans et al. | |
| 6,208,765 B1 | 3/2001 | Bergen | |
| 6,272,179 B1 | 8/2001 | Kadono | |
| 6,285,804 B1 | 9/2001 | Crinon et al. | |
| 6,289,049 B1 | 9/2001 | Kim et al. | |
| 6,292,837 B1 | 9/2001 | Miller et al. | |
| 6,314,208 B1 | 11/2001 | Konstantinides et al. | |
| 6,349,154 B1 | 2/2002 | Kleihorst | |
| 6,359,929 B1 | 3/2002 | Boon | |
| 6,363,119 B1* | 3/2002 | Oami | 375/240.03 |
| 6,381,277 B1 | 4/2002 | Chun et al. | |
| 6,434,197 B1 | 8/2002 | Wang et al. | |
| 6,473,460 B1 | 10/2002 | Topper | |
| 6,611,620 B1 | 8/2003 | Kobayashi et al. | |
| 6,628,845 B1 | 9/2003 | Stone et al. | |
| 6,650,704 B1 | 11/2003 | Carlson et al. | |
| 6,654,419 B1 | 11/2003 | Sriram et al. | |
| 6,711,211 B1 | 3/2004 | Lainema | |
| 6,735,249 B1 | 5/2004 | Karczewicz et al. | |
| 6,798,901 B1 | 9/2004 | Acharya et al. | |
| 6,907,079 B2 | 6/2005 | Gomila et al. | |
| 7,106,910 B2 | 9/2006 | Acharya et al. | |
| 7,116,830 B2 | 10/2006 | Srinivasan | |
| 7,158,681 B2 | 1/2007 | Persiantsev | |
| 7,197,070 B1 | 3/2007 | Zhang et al. | |
| 7,218,674 B2 | 5/2007 | Kuo | |
| 7,263,125 B2 | 8/2007 | Lainema | |
| 7,277,587 B2 | 10/2007 | Sun | |
| 7,333,544 B2 | 2/2008 | Kim et al. | |
| 7,466,774 B2 | 12/2008 | Boyce | |
| 7,602,851 B2 | 10/2009 | Lee et al. | |
| 7,602,997 B2 | 10/2009 | Young | |
| 7,689,051 B2 | 3/2010 | Mukerjee | |
| 7,924,918 B2 | 4/2011 | Lelescu et al. | |
| 7,983,338 B2* | 7/2011 | Takamura et al. | 375/240.12 |
| 8,094,722 B2 | 1/2012 | Wang | |
| 8,111,914 B2 | 2/2012 | Lee et al. | |
| 8,135,064 B2 | 3/2012 | Tasaka et al. | |
| 8,320,470 B2 | 11/2012 | Huang et al. | |
| 8,369,402 B2 | 2/2013 | Kobayashi et al. | |
| 8,369,411 B2 | 2/2013 | Au et al. | |
| 2002/0017565 A1 | 2/2002 | Ju et al. | |
| 2002/0026639 A1 | 2/2002 | Haneda | |
| 2002/0031272 A1 | 3/2002 | Bagni et al. | |
| 2002/0071485 A1 | 6/2002 | Caglar et al. | |
| 2003/0202705 A1 | 10/2003 | Sun | |
| 2003/0215018 A1 | 11/2003 | MacInnis et al. | |
| 2003/0215135 A1 | 11/2003 | Caron et al. | |
| 2004/0001634 A1 | 1/2004 | Mehrotra | |
| 2004/0252886 A1 | 12/2004 | Pan et al. | |
| 2005/0180500 A1 | 8/2005 | Chiang et al. | |
| 2005/0265444 A1* | 12/2005 | Kim | 375/240.1 |
| 2006/0056689 A1 | 3/2006 | Wittebrood et al. | |
| 2006/0203916 A1 | 9/2006 | Chandramouly et al. | |
| 2006/0215751 A1 | 9/2006 | Reichel et al. | |
| 2007/0019729 A1 | 1/2007 | Nakagomi et al. | |
| 2007/0025441 A1 | 2/2007 | Ugur et al. | |
| 2007/0036354 A1 | 2/2007 | Wee et al. | |
| 2007/0065026 A1* | 3/2007 | Lee et al. | 382/236 |
| 2007/0080971 A1 | 4/2007 | Sung | |
| 2007/0110327 A1 | 5/2007 | Han | |
| 2007/0121100 A1 | 5/2007 | Divo | |
| 2007/0177673 A1 | 8/2007 | Yang | |
| 2007/0216777 A1 | 9/2007 | Quan et al. | |
| 2007/0217701 A1 | 9/2007 | Liu et al. | |
| 2008/0069440 A1 | 3/2008 | Forutanpour | |
| 2008/0123747 A1 | 5/2008 | Lee et al. | |
| 2008/0152008 A1 | 6/2008 | Sun et al. | |
| 2008/0170615 A1 | 7/2008 | Sekiguchi et al. | |
| 2008/0181299 A1 | 7/2008 | Tian et al. | |
| 2008/0192821 A1 | 8/2008 | Malayath et al. | |
| 2008/0211901 A1* | 9/2008 | Civanlar et al. | 348/14.09 |
| 2008/0212678 A1 | 9/2008 | Booth et al. | |
| 2008/0239354 A1 | 10/2008 | Usui | |
| 2008/0260042 A1 | 10/2008 | Shah et al. | |
| 2008/0294962 A1 | 11/2008 | Goel | |
| 2009/0161763 A1 | 6/2009 | Rossignol et al. | |
| 2009/0190659 A1 | 7/2009 | Lee et al. | |
| 2009/0190660 A1 | 7/2009 | Kusakabe et al. | |
| 2009/0232401 A1 | 9/2009 | Yamashita et al. | |
| 2009/0257492 A1 | 10/2009 | Andersson et al. | |
| 2009/0284651 A1 | 11/2009 | Srinivasan | |
| 2010/0021009 A1 | 1/2010 | Yao | |
| 2010/0023979 A1 | 1/2010 | Patel et al. | |
| 2010/0034265 A1 | 2/2010 | Kim et al. | |
| 2010/0034268 A1 | 2/2010 | Kusakabe et al. | |
| 2010/0086028 A1 | 4/2010 | Tanizawa et al. | |
| 2010/0104021 A1 | 4/2010 | Schmit | |
| 2010/0111182 A1 | 5/2010 | Karczewicz et al. | |
| 2010/0118945 A1 | 5/2010 | Wada et al. | |
| 2010/0177819 A1 | 7/2010 | Jeon et al. | |
| 2010/0194910 A1 | 8/2010 | Matsuo et al. | |
| 2010/0195715 A1 | 8/2010 | Liu et al. | |
| 2010/0226436 A1 | 9/2010 | Dane et al. | |
| 2011/0002541 A1 | 1/2011 | Varekamp | |
| 2011/0026591 A1 | 2/2011 | Bauza et al. | |
| 2011/0033125 A1 | 2/2011 | Shiraishi | |
| 2011/0052087 A1 | 3/2011 | Mukherjee | |
| 2011/0069890 A1 | 3/2011 | Besley | |
| 2011/0158529 A1 | 6/2011 | Malik | |
| 2011/0211757 A1 | 9/2011 | Kim et al. | |
| 2011/0235706 A1 | 9/2011 | Demircin et al. | |
| 2011/0243225 A1 | 10/2011 | Min et al. | |
| 2011/0243229 A1 | 10/2011 | Kim et al. | |
| 2011/0243230 A1 | 10/2011 | Liu | |
| 2011/0249741 A1 | 10/2011 | Zhao et al. | |
| 2011/0255592 A1 | 10/2011 | Sung et al. | |
| 2011/0268359 A1 | 11/2011 | Steinberg et al. | |
| 2011/0293001 A1 | 12/2011 | Lim et al. | |
| 2012/0020408 A1 | 1/2012 | Chen et al. | |
| 2012/0039388 A1 | 2/2012 | Kim et al. | |
| 2012/0082220 A1 | 4/2012 | Mazurenko et al. | |
| 2012/0278433 A1 | 11/2012 | Liu et al. | |
| 2012/0287998 A1 | 11/2012 | Sato | |
| 2012/0307884 A1 | 12/2012 | MacInnis | |
| 2012/0307890 A1 | 12/2012 | Lu et al. | |
| 2012/0307906 A1 | 12/2012 | Kim et al. | |
| 2012/0314942 A1 | 12/2012 | Williams et al. | |
| 2013/0077671 A1 | 3/2013 | Tanaka | |
| 2013/0077696 A1* | 3/2013 | Zhou | 375/240.24 |
| 2014/0098856 A1 | 4/2014 | Gu et al. | |
| 2014/0226715 A1* | 8/2014 | Sato | 375/240.03 |

FOREIGN PATENT DOCUMENTS

| | | |
|---|---|---|
| JP | 2007267414 | 10/2007 |
| WO | WO2011065735 A2 | 6/2011 |

OTHER PUBLICATIONS

Patent Cooperation Treaty Invitation to Pay Fees, International Searching Authority International Application No. PCT/US2013/063722 mailed on Dec. 9, 2013.

Schwarz H. et al.: "SNR-scalable extension of H.264/AVC", Image Processing, 2004. ICIP 2004 International Conference on Singapore Oct. 24-27, 2004.

Bankoski et al. "Technical Overview of VP8, An Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

(56) References Cited

OTHER PUBLICATIONS

Mozilla, "Introduction to Video Coding Part 1: Transform Coding", Video Compression Overview, Mar. 2012, 171 pp.
Overview; VP7 Data Format and Decoder. Version 1.5. On2 Technologies, Inc. Dated Mar. 28, 2005.
Park, Jun Sung, et al., "Selective Intra Prediction Mode Decision for H.264/AVC Encoders", World Academy of Science, Engineering and Technology 13, (2006).
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May, 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Su M_T Sun University of Washington et al. "Encoder Optimization for H.264/AVC Fidelity Range Extensions" Jul. 12, 2005.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.
Ebrahimi, Touradj, et al.; "Joint motion estimation and segmentation for very low bitrate video coding", SPIE vol. 2501, 1995, 12 pp.
Guillotel, Philippe, et al.; "Comparison of motion vector coding techniques", SPIE vol. 2308, 1994, 11 pp.
Karczewicz, Maria, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Schiller, H., et al.; "Efficient Coding of Side Information in a Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
ISR and Written Opinion in related matter PCT/US2013/063722, mailed Mar. 19, 2014.

* cited by examiner

LOSSLESS INTRA-PREDICTION VIDEO CODING

TECHNICAL FIELD

This disclosure relates to encoding and decoding visual data, such as video stream data, for transmission or storage using intra prediction.

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. Compression techniques can be lossy or lossless. Lossy compression techniques generate video streams that are acceptable for most video viewing. However, some applications, such as video editing or medical imaging, for example, may require lossless video encoding. Lossy video encoding can result in encoded video bitstreams having a higher compression ratio than lossless encoding. Compression ratio can be defined as the ratio of compressed size to uncompressed size of the video data.

SUMMARY

Disclosed herein are aspects of systems, methods and apparatuses for coding a video stream. One aspect of the teachings herein is a method encoding a digital video stream including a plurality of frames, the method including selecting a block of a frame of the plurality of frames, the block being one of a plurality of blocks of the frame, performing intra-prediction on the block to calculate a first residual block, encoding the first residual block to form an encoded residual block, entropy coding the encoded residual block to include in an encoded video bitstream, decoding the encoded residual block to form a second residual block, subtracting the second residual block from the first residual block to form a difference residual, entropy coding the difference residual block to form an encoded difference residual block, and including the encoded difference residual block in the encoded video bitstream.

Another aspect of the teachings herein is an apparatus for encoding a video stream including a plurality of frames. The apparatus includes a memory and a processor. The processor is configured to execute instructions stored in memory to select a block of a frame of the plurality of frames, the block being one of a plurality of blocks of the frame, perform intra-prediction on the block to calculate a first residual block, encode the first residual block to form an encoded residual block, entropy code the encoded residual block to include in an encoded video bitstream, decode the encoded residual block to form a second residual block, subtract the second residual block from the first residual block to form a difference residual, entropy code the difference residual block to form an encoded difference residual block, and include the encoded difference residual block in the encoded video bitstream.

Yet another aspect of the teachings herein is a method for decoding an encoded video bitstream including a plurality of encoded frames. The method includes receiving an encoded residual block of a frame of the plurality of encoded frames, the encoded residual block being one of a plurality of encoded residual blocks of the frame and the encoded residual block formed by performing intra-prediction on a block to calculate a first residual block, encoding the first residual block to form the encoded residual block, and entropy coding the encoded residual block to include in the encoded video bitstream. The method also includes receiving an encoded difference residual block from the encoded video bitstream, the encoded difference residual block formed by decoding the encoded residual block to form a second residual block, subtracting the second residual block from the first residual block to form a difference residual, and entropy coding the difference residual block to form the encoded difference residual block. The method further includes decoding the encoded residual block to form a decoded residual block, entropy decoding the encoded difference residual block to form a decoded difference residual block, adding the decoded difference residual block to the decoded residual block to form a residual block, and performing intra-prediction to form a prediction block and adding the prediction block to the residual block to generate a reconstructed block.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. Compressing such digital video is often desirable. Lossy encoding can achieve high compression ratios by employing transformations and quantization techniques that are not 100% reversible, in the sense that encoding and decoding image data using these techniques can result in output video data that does not match the input video data.

In contrast, lossless video stream coding can result in an output video stream substantially identical to the input video stream. Generally, lossless video stream coding has limitations on compression ratios.

The teachings herein can improve compression ratios for lossless encoding for blocks of a video stream coded using intra-prediction. In an example of the teachings herein, intra-prediction creates a residual block, also called a residual, which represents the difference between a predicted block and the actual block being encoded. This first residual can be further encoded using a transform followed by quantization and entropy encoding to form an encoded residual. This encoded residual represents an example of lossy encoding. Decoding the encoded first residual involves constructing a second residual by performing the encoding steps in reverse order. The decoded second residual generally differs from the first residual due to the errors introduced by lossy encoding. The lossy second residual may be subtracted from the first residual to yield a third residual, also called a difference residual, which is then encoded using lossless entropy coding. The encoded first residual and encoded third residual can then be included in the output encoded video bitstream. Upon receipt by a decoder, the encoded third and first residuals may be decoded and so that the lossy second residual and lossless third residual added together form a lossless residual. The lossless residual can then be further processed using intra-prediction to re-form the original block.

Such teachings can provide lossless video stream encoding with higher compression ratios than alternative lossless encoding techniques. High compression ratios can be achieved by combining transformations and quantization techniques that are not 100% reversible with lossless techniques to achieve lossless encoding with compression.

First discussed below are environments in which aspects of this disclosure can be implemented, and then details of certain implementations are explained.

Figure 1:
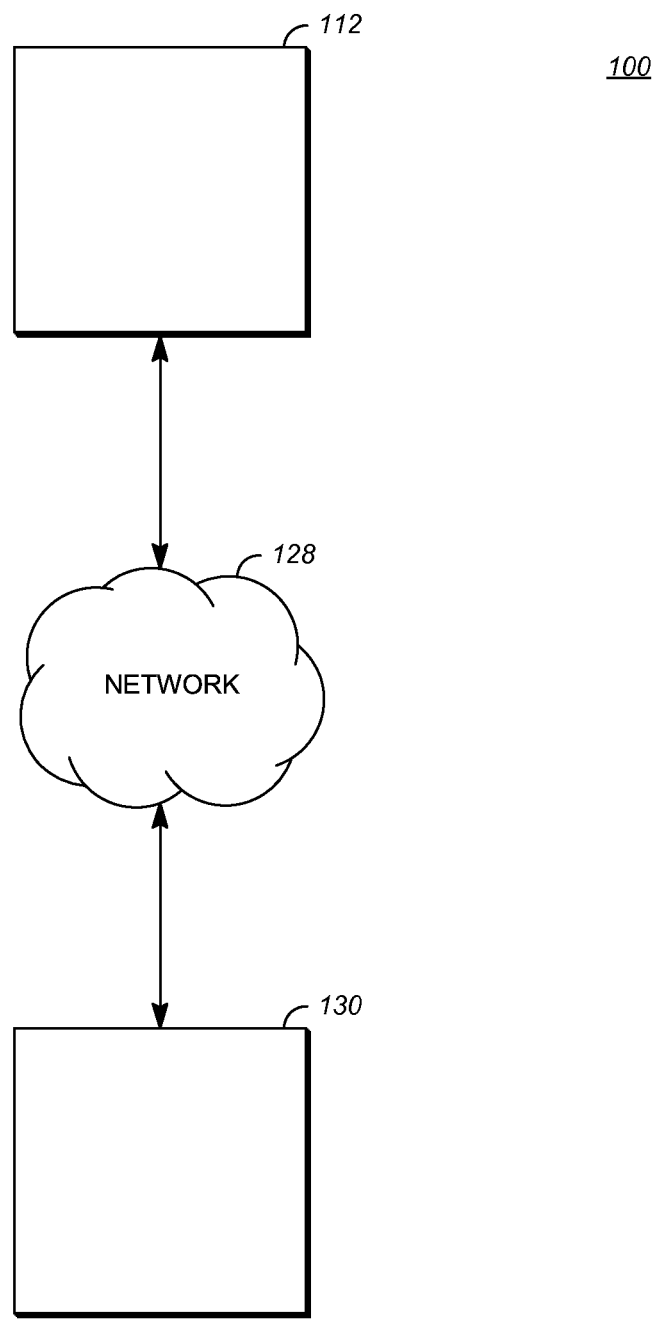
FIG. 1 is a schematic of a video encoding and decoding system.

FIG. 1 is a schematic of a video encoding and decoding system 100. An exemplary transmitting station 112 can be, for example, a computer having an internal configuration of hardware such as that described in FIG. 2. However, other suitable implementations of transmitting station 112 are possible. For example, the processing of transmitting station 112 can be distributed among multiple devices.

A network 128 can connect the transmitting station 112 and a receiving station 130 for encoding and decoding of the video stream. Specifically, the video stream can be encoded in transmitting station 112 and the encoded video stream can be decoded in receiving station 130. Network 128 can be, for example, the Internet. Network 128 can also be a local area network (LAN), wide area network (WAN), virtual private network (VPN), cellular telephone network or any other means of transferring the video stream from transmitting station 112 to, in this example, receiving station 130.

Figure 2:
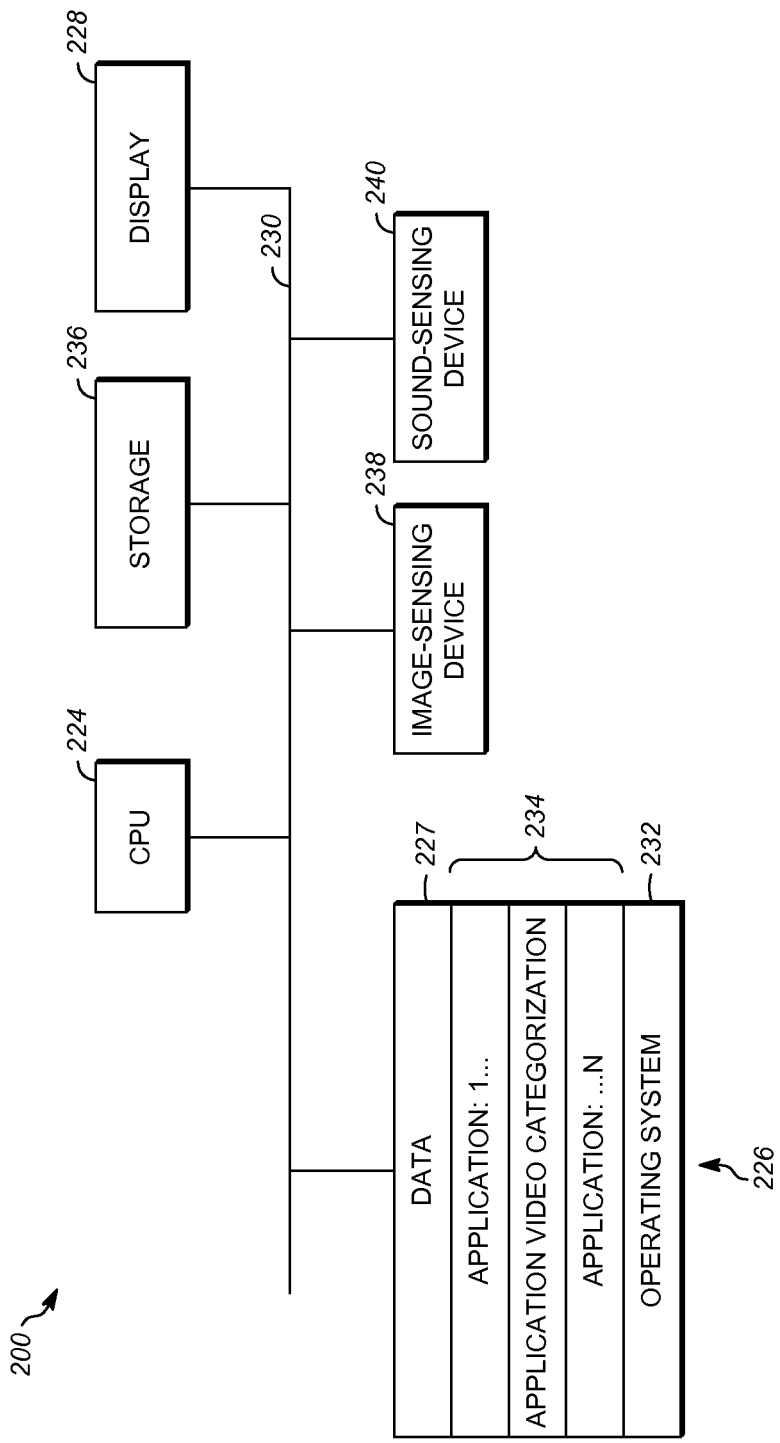
FIG. 2 is a block diagram of an exemplary computing device that can implement a transmitting station or a receiving station.

Receiving station 130, in one example, can be a computer having an internal configuration of hardware such as that described in FIG. 2. However, other suitable implementations of receiving station 130 are possible. For example, the processing of receiving station 130 can be distributed among multiple devices.

Other implementations of video encoding and decoding system 100 are possible. For example, an implementation can omit network 128. In another implementation, a video stream can be encoded and then stored for transmission at a later time to receiving station 130 or any other device having memory. In one implementation, receiving station 130 receives (e.g., via network 128, a computer bus, and/or some communication pathway) the encoded video stream and stores the video stream for later decoding. In an exemplary implementation, a real-time transport protocol (RTP) is used for transmission of the encoded video over network 128. In another implementation, a transport protocol other than RTP may be used, e.g., an HTTP-based video streaming protocol.

FIG. 2 is a block diagram of an exemplary computing device 200 that can implement a transmitting station or a receiving station. For example, computing device 200 can implement one or both of transmitting station 112 and receiving station 130 of FIG. 1. Computing device 200 can be in the form of a computing system including multiple computing devices, or in the form of a single computing device, for example, a mobile phone, a tablet computer, a laptop computer, a notebook computer, a desktop computer, and the like.

A CPU 224 in computing device 200 can be a conventional central processing unit. Alternatively, CPU 224 can be any other type of device, or multiple devices, capable of manipulating or processing information now-existing or hereafter developed. Although the disclosed implementations can be practiced with a single processor as shown, e.g., CPU 224, advantages in speed and efficiency can be achieved using more than one processor.

A memory 226 in computing device 200 can be a read only memory (ROM) device or a random access memory (RAM) device in an implementation. Any other suitable type of storage device can be used as memory 226. Memory 226 can include code and data 227 that is accessed by CPU 224 using a bus 230. Memory 226 can further include an operating system 232 and application programs 234, the application programs 234 including at least one program that permits CPU 224 to perform the methods described here. For example, application programs 234 can include applications 1 through N, which further include a video communication application that performs the methods described here. Computing device 200 can also include a secondary storage 236, which can, for example, be a memory card used with a mobile computing device 200. Because the video communication sessions may contain a significant amount of information, they can be stored in whole or in part in secondary storage 236 and loaded into memory 226 as needed for processing.

Computing device 200 can also include one or more output devices, such as a display 228. Display 228 may be, in one example, a touch sensitive display that combines a display with a touch sensitive element that is operable to sense touch inputs. Display 228 can be coupled to CPU 224 via bus 230. Other output devices that permit a user to program or otherwise use computing device 200 can be provided in addition to or as an alternative to display 228. When the output device is or includes a display, the display can be implemented in various ways, including by a liquid crystal display (LCD), a cathode-ray tube (CRT) display or light emitting diode (LED) display, such as an OLED display.

Computing device 200 can also include or be in communication with an image-sensing device 238, for example a camera, or any other image-sensing device 238 now existing or hereafter developed that can sense an image such as the image of a user operating computing device 200. Image-sensing device 238 can be positioned such that it is directed toward the user operating computing device 200. In an example, the position and optical axis of image-sensing device 238 can be configured such that the field of vision includes an area that is directly adjacent to display 228 and from which display 228 is visible.

Computing device 200 can also include or be in communication with a sound-sensing device 240, for example a microphone, or any other sound-sensing device now existing or hereafter developed that can sense sounds near computing device 200. Sound-sensing device 240 can be positioned such that it is directed toward the user operating computing device 200 and can be configured to receive sounds, for example, speech or other utterances, made by the user while the user operates computing device 200.

Although FIG. 2 depicts CPU 224 and memory 226 of computing device 200 as being integrated into a single unit, other configurations can be utilized. The operations of CPU 224 can be distributed across multiple machines (each machine having one or more of processors) that can be coupled directly or across a local area or other network. Memory 226 can be distributed across multiple machines such as a network-based memory or memory in multiple machines performing the operations of computing device 200. Although depicted here as a single bus, bus 230 of computing device 200 can be composed of multiple buses. Further, secondary storage 236 can be directly coupled to the other components of computing device 200 or can be accessed via a network and can comprise a single integrated unit such as a memory card or multiple units such as multiple memory cards. Computing device 200 can thus be implemented in a wide variety of configurations.

Figure 3:
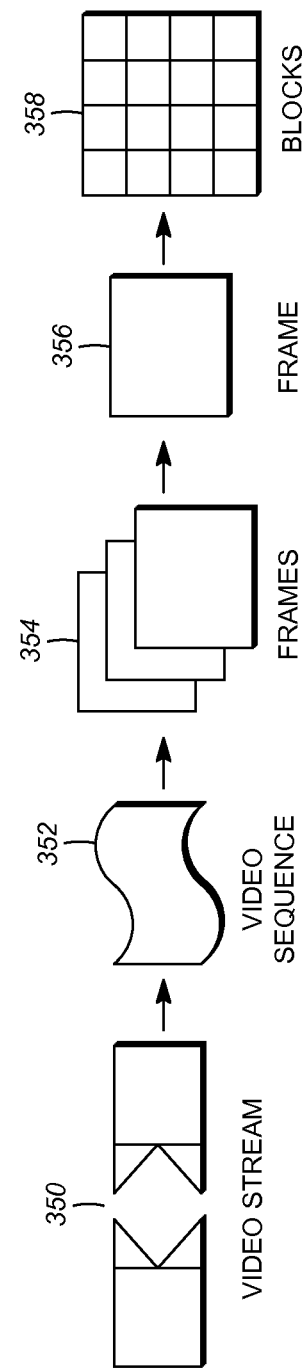
FIG. 3 is a diagram of a typical video stream to be encoded and subsequently decoded.

FIG. 3 is a diagram of an example of a video stream 350 to be encoded and subsequently decoded. Video stream 350 includes a video sequence 352. At the next level, video sequence 352 includes a number of adjacent frames 354. While three frames are depicted as adjacent frames 354, video sequence 352 can include any number of adjacent frames. Adjacent frames 354 can then be further subdivided into individual frames, e.g., a single frame 356. At the next level, single frame 356 can be divided into a series of blocks 358, which can contain data corresponding to, for example, 16×16 pixels in frame 356. Blocks 358 can also be arranged in planes of data. For example, a corresponding block in each plane can respectively contain luminance and chrominance data for the pixels of the block. Blocks 358 can also be of any other suitable size such as 16×8 pixel groups or 8×16 pixel groups and can be further subdivided into smaller blocks depending on the application. Unless otherwise noted, the terms block and macroblock are used interchangeably herein.

Figure 4:
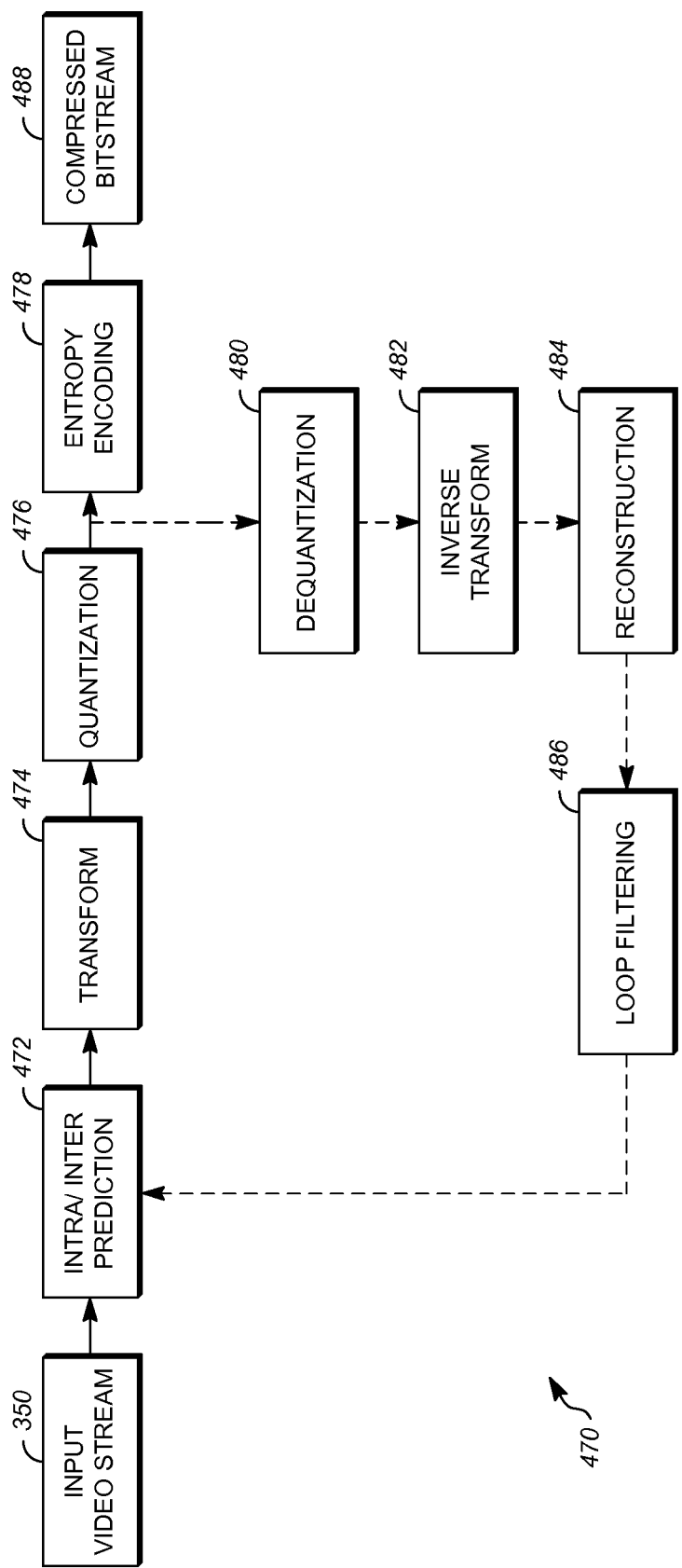
FIG. 4 is a block diagram of a video compression system in accordance with an implementation.

FIG. 4 is a block diagram of an encoder 470 in accordance with an implementation. Encoder 470 can be implemented, as described above, in transmitting station 112 such as by providing a computer software program stored in memory, for example, memory 226. The computer software program can include machine instructions that, when executed by a processor such as CPU 224, cause transmitting station 112 to encode video data in the manner described in FIG. 4. Encoder 470 can also be implemented as specialized hardware included in, for example, transmitting station 112. Encoder 470 has the following stages to perform the various functions in a forward path (shown by the solid connection lines) to produce an encoded or compressed bitstream 488 using input video stream 350: an intra/inter prediction stage 472, a transform stage 474, a quantization stage 476, and an entropy encoding stage 478. Encoder 470 may also include a reconstruction path (shown by the dotted connection lines) to reconstruct a frame for encoding of future blocks. In FIG. 3, encoder 470 has the following stages to perform the various functions in the reconstruction path: a dequantization stage 480, an inverse transform stage 482, a reconstruction stage 484, and a loop filtering stage 486. Other structural variations of encoder 470 can be used to encode video stream 350.

When video stream 350 is presented for encoding, each frame 356 including planes 357 within the video stream 350 can be processed in units of blocks. At the intra/inter prediction stage 472, each block can be encoded using intra-frame prediction (within a single frame) or inter-frame prediction (from frame to frame). In any case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at intra/inter prediction stage 472 to produce a residual block (also called a residual). Transform stage 474 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (DC) coefficient at the top-left of the matrix and the highest frequency coefficient at the bottom-right of the matrix.

Quantization stage 476 converts the transform coefficients into discrete quantum values, which are referred to as quantized transform coefficients, using a quantizer value or a quantization level. The quantized transform coefficients are then entropy encoded by entropy encoding stage 478. The entropy-encoded coefficients, together with other information used to decode the block, which may include for example the type of prediction used, motion vectors and quantizer value, are then output to the compressed bitstream 488. Compressed bitstream 488 can be formatted using various techniques, such as variable length coding (VLC) or arithmetic coding. Compressed bitstream 488 can also be referred to as an encoded video stream and the terms will be used interchangeably herein.

The reconstruction path in FIG. 4 (shown by the dotted connection lines) can be used to ensure that both encoder 470 and a decoder 500 (described below) use the same reference frames to decode compressed bitstream 488. The reconstruction path performs functions that are similar to functions that take place during the decoding process that are discussed in more detail below, including dequantizing the quantized transform coefficients at dequantization stage 480 and inverse transforming the dequantized transform coefficients at inverse transform stage 482 to produce a derivative residual block (also called a derivative residual). At reconstruction stage 484, the prediction block that was predicted at the intra/inter prediction stage 472 can be added to the derivative residual to create a reconstructed block. Loop filtering stage 486 can be applied to the reconstructed block to reduce distortion such as blocking artifacts.

Other variations of encoder 470 can be used to encode compressed bitstream 488. For example, a non-transform based encoder 470 can quantize the residual signal directly without transform stage 474. In another implementation, an encoder 470 can have quantization stage 476 and dequantization stage 480 combined into a single stage.

Figure 5:
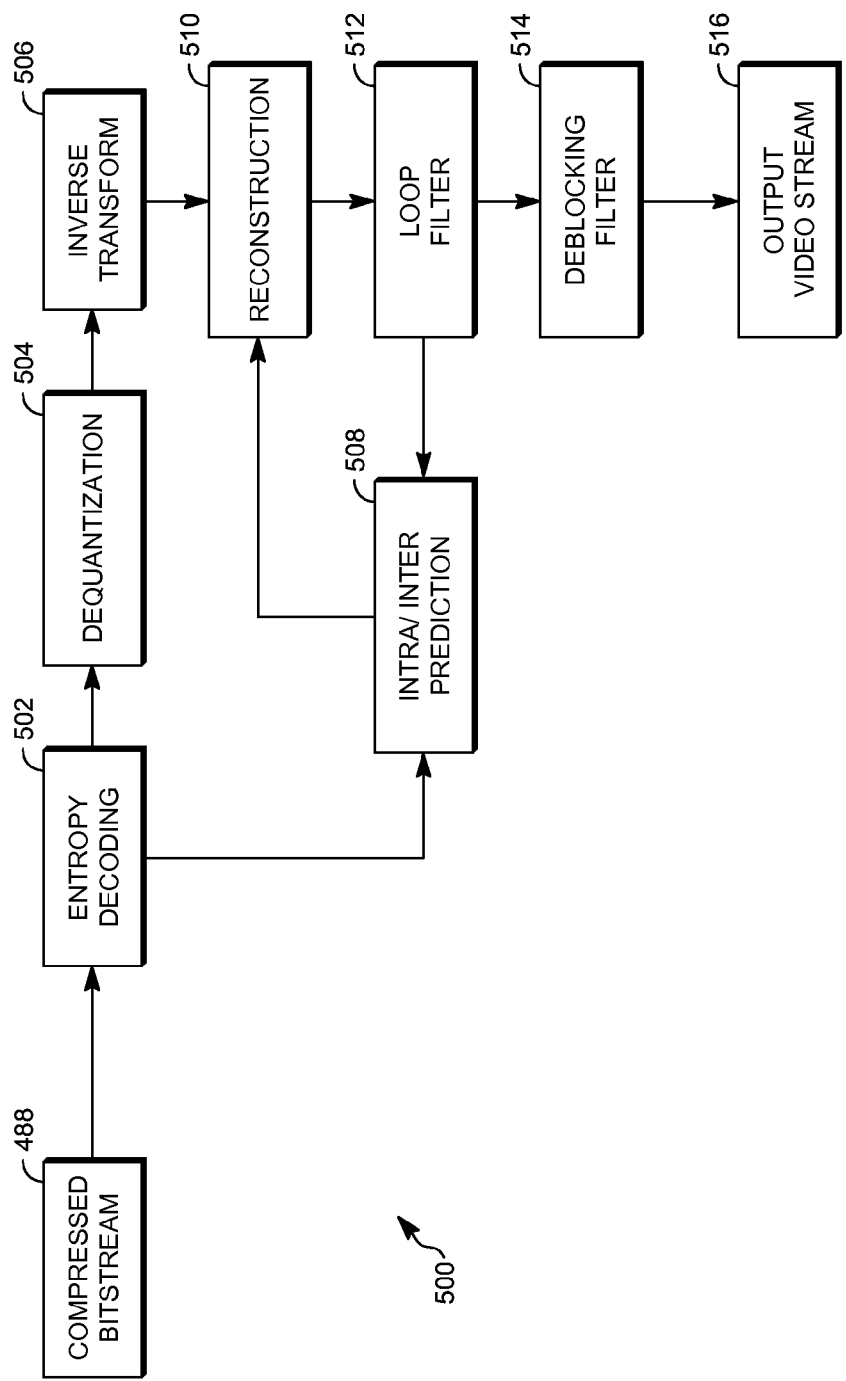
FIG. 5 is a block diagram of a video decompression system in accordance with another implementation.

FIG. 5 is a block diagram of a decoder 500 in accordance with another implementation. Decoder 500 can be implemented in receiving station 130, for example, by providing a computer software program stored in memory 226. The computer software program can include machine instructions that, when executed by a processor such as CPU 224, cause receiving station 130 to decode video data in the manner described in FIG. 5. Decoder 500 can also be implemented in hardware included in, for example, transmitting station 112 or receiving station 130.

Decoder 500, similar to the reconstruction path of encoder 470 discussed above, includes in one example the following stages to perform various functions to produce an output video stream 516 from compressed bitstream 488: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of decoder 500 can be used to decode compressed bitstream 488.

When compressed bitstream 488 is presented for decoding, the data elements within compressed bitstream 488 can be decoded by entropy decoding stage 502 (using, for example, arithmetic coding) to produce a set of quantized transform coefficients. Dequantization stage 504 dequantizes the quantized transform coefficients, and inverse transform stage 506 inverse transforms the dequantized transform coefficients to produce a derivative residual that can be identical to that created by inverse transform stage 482 in encoder 470. Using header information decoded from compressed bitstream 488, decoder 500 can use intra/inter prediction stage 508 to create the same prediction block as was created in encoder 470, e.g., at intra/inter prediction stage 472. At reconstruction stage 510, the prediction block can be added to the derivative residual to create a reconstructed block. Loop filtering stage 512 can be applied to the reconstructed block to reduce blocking artifacts. Other filtering can be applied to the reconstructed block. For example, deblocking filtering stage 514 can be applied to the reconstructed block to reduce blocking distortion, and the result is output as output video stream 516. Output video stream 516 can also be referred to as a decoded video stream and the terms will be used interchangeably herein.

Other variations of decoder 500 can be used to decode compressed bitstream 488. For example, decoder 500 can produce output video stream 516 without deblocking filtering stage 514.

Figure 6:
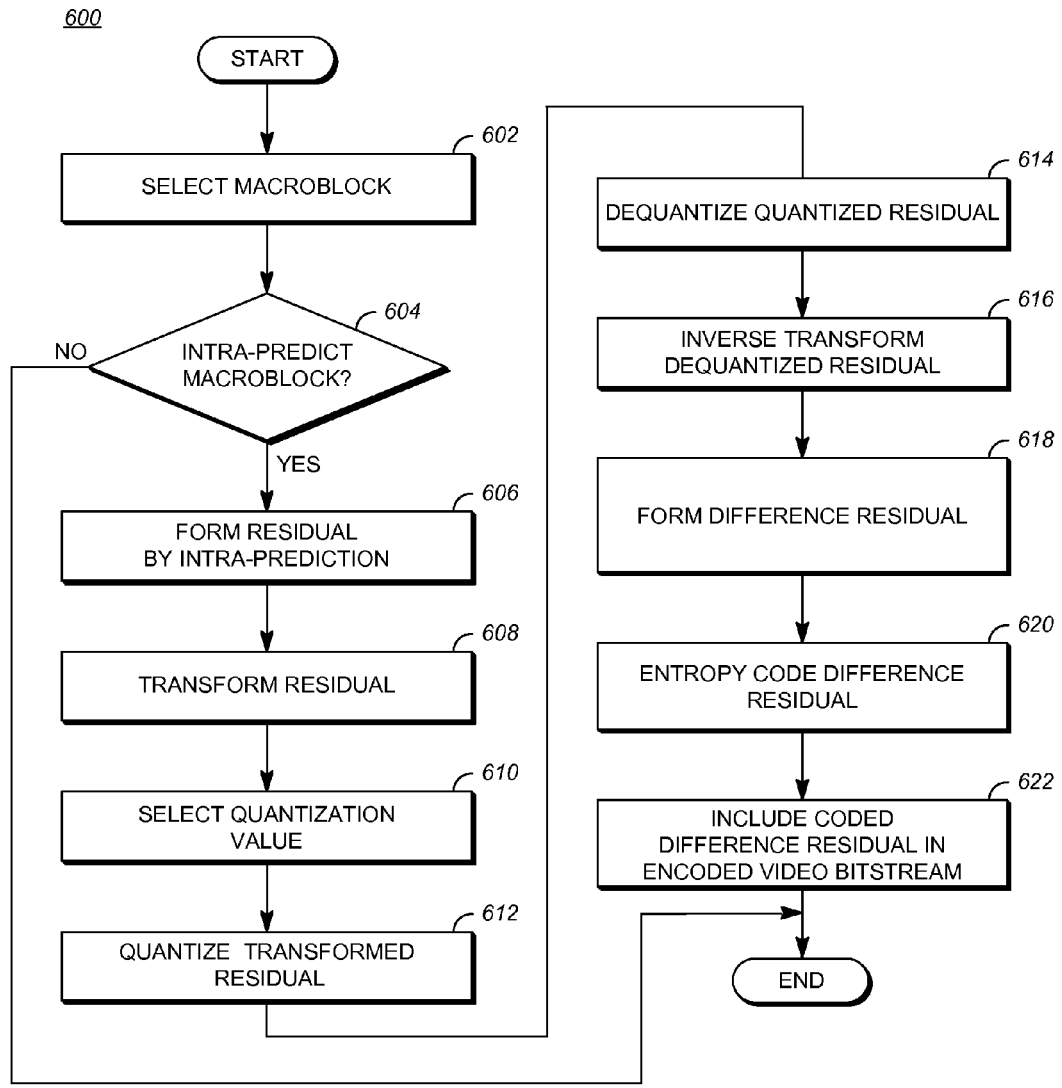
FIG. 6 is a flowchart of a process for lossless encoding of a video stream using intra-prediction according to an aspect of the teachings herein.

FIG. 6 is a flowchart of a process 600 for lossless encoding of a video stream using intra-prediction according to an aspect of the teachings herein. Process 600 can be implemented in an encoder such as encoder 400 to select lossless encoding using intra-prediction modes used by encoder 400 to encode a video stream. Process 600 can be implemented, for example, as a software program that is executed by a computing device such as transmitting station 112 or receiving station 130. The software program can include machine-readable instructions that are stored in a memory such as memory 226 that, when executed by a processor such as CPU 224, cause the computing device to perform process 600. Process 600 can also be implemented using hardware in whole or in part. As explained above, some computing devices may have multiple memories and multiple processors, and the steps of process 600 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

For simplicity of explanation, process 600 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

At step 602, a block from a frame of video data is selected for processing. Select can mean choose, indicate, determine or otherwise select in any manner whatsoever. As shown in FIG. 3, a video stream can include frames of video data that include macroblocks or blocks. Blocks can be processed in raster scan order starting with the block at the upper left hand corner and proceeding along successive rows until all of the blocks of the frame are processed. Other scan orders can be used with the teachings herein.

At step 604, the selected block is tested to determine if intra-prediction can be used to process the block. As mentioned briefly above, intra-prediction is a process that uses pixel values from blocks peripheral to the current block to predict pixel values within the current block. This is contrasted with inter-prediction, where pixel values from another (e.g., temporally nearby) frame can be used to predict the pixel values in a block. Strategies used to determine whether or not to use intra-prediction or which intra-prediction mode to use include calculating test residuals for inter-frame prediction and various intra-prediction modes and comparing the results. The magnitude of the test residuals can be compared to select a prediction mode having the smallest residual value, for example. At step 604, if intra-prediction is not selected, the process ends, and the block may be conventionally encoded using inter-prediction techniques. If intra-prediction is selected at step 604, processing advances to step 606.

At step 606, intra-prediction is used to predict the pixel values of the currently-selected block. In intra-prediction, a block including predicted pixels is subtracted pixel-by-pixel from the currently selected block to form a residual block, called a first residual herein. The pixel values in the first residual can be smaller than the pixel values in the currently-selected block, thereby resulting in a smaller number of bits to be included in an output encoded video bitstream. The type of intra-prediction, i.e., vertical, horizontal, diagonal, etc., can be determined using any number of known techniques.

At step 608, the first residual can be transformed using a transform, for example a DCT as discussed in relation to FIG. 4, above. The next step in encoding the residual block is to select a quantizer or quantization value. At step 610, process 600 selects an optimal value to use in quantization of the transformed residual block. Quantization reduces the number of unique states used to represent the transformed residual.

An optimal quantization value can be selected by performing steps 612, 614, 616 and 618 on the transformed residual block using more than one quantization value and comparing the results. A quantization value can be selected that yields the largest reduction in the number of bits in the quantized residual block while maintaining acceptable fidelity in the de-quantized residual block, for example. The number of bits is referred to as a bit cost, and the reduction is referred to a bit savings. The quantization adjustment acts as an energy distribution control from the transform domain to the spatial domain, so that the optimal distribution can be obtained to minimize the cost of coding. The adjustment in the block level may best suit the local statistics of the image. It has been shown that this local optimization by adjusting quantization values in the block level can save a considerable number of the total bits, compared with using frame level quantization control.

At step 612, the selected quantization value is used to quantize the transformed first residual to form a quantized first residual.

Following step 612, the quantized first residual can be entropy coded and included in the encoded video bitstream to be output by process 600. This entropy encoded first residual can also be stored in memory or using any storage media available to process 600 to be included in the encoded video bitstream at a later time. At this point or at any point in the process, bits can be added to one or more headers in the encoded video bitstream to indicate which type of prediction and coding has been performed on the block to guide a decoder in decoding the block.

At step 614, the quantized first residual can be de-quantized, and at step 616, the de-quantized residual is inverse transformed to form a decoded residual block. The decoded residual block is called a second residual since it is not identical to the original, first residual formed at step 606. Instead, the second residual has differences in pixel values introduced by the lossy compression in steps 608, 610 and 612.

Next, at step 618, the second residual output from step 616 is subtracted from the first residual formed in step 606 to form a difference residual block (also called a difference residual or third residual) that reflects the differences in pixel values introduced by the lossy compression of the first residual. When decoding a block encoded according to this technique, adding the difference residual to the second residual can recreate the first residual losslessly, eliminating the unwanted changes in the reconstructed data otherwise resulting from lossy compression.

At step 620, the difference residual is entropy coded. As mentioned above, entropy coding is lossless. Therefore, when the encoded difference residual is entropy decoded, the difference residual will be restored to the same state it was in before entropy coding. That is, the difference residual is subject to lossless compression so that, when decoded, its content is identical to its original content within calculation errors due to rounding, etc. At step 622, the encoded difference residual is included in the output encoded video bitstream. Bits can be set in a header such as the block header in the output encoded video bitstream to inform the decoder that the difference block is included in the bitstream for use in decoding the block. Process 600 then ends for the current block and repeats for each block of the frame.

When a decoder, such as decoder 500, receives the encoded bitstream, the encoded first residual of an intra-predicted block can be entropy decoded (using, for example, arithmetic coding) to produce a set of quantized transform coefficients. The quantized transform coefficients can then be dequantized and then inverse transformed to produce the second residual. The encoded difference residual can be entropy decoded and added to the second residual to recreate the first residual. Using header information decoded from the compressed bitstream, an intra/inter prediction stage such as intra/inter prediction stage 508 can create the same prediction block as was created in encoder. At reconstruction stage 510, the prediction block can be added to the first residual to create a reconstructed block. One or more filters can be applied to the reconstructed block before the block is output as part of an output video stream.

By entropy encoding the difference residual in step 620 and including the entropy coded difference residual in the output encoded video bitstream along with the encoded first residual, a decoder can perform lossless decoding of the block while saving bits in comparison to simply entropy encoding the original residual. Bits can be set in a header in the output encoded video bitstream to inform the decoder that both a difference residual and an encoded residual are included in the bitstream for use in decoding the block.

The aspects of encoding and decoding described above illustrate some exemplary encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of transmitting station 112 and/or receiving station 130 (and the algorithms, methods, instructions, etc., stored thereon and/or executed thereby, including by encoder 470 and decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 112 and receiving station 130 do not necessarily have to be implemented in the same manner.

Further, in one aspect, for example, transmitting station 112 or receiving station 130 can be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Transmitting station 112 and receiving station 130 can, for example, be implemented on computers in a video conferencing system. Alternatively, transmitting station 112 can be implemented on a server and receiving station 130 can be implemented on a device separate from the server, such as a hand-held communications device. In this instance, transmitting station 112 can encode content using an encoder 470 into an encoded video signal and transmit the encoded video signal to the communications device. In turn, the communications device can then decode the encoded video signal using a decoder 500. Alternatively, the communications device can decode content stored locally on the communications device, for example, content that was not transmitted by transmitting station 112. Other suitable transmitting station 112 and receiving station 130 implementation schemes are available. For example, receiving station 130 can be a generally stationary personal computer rather than a portable communications device and/or a device including an encoder 470 may also include a decoder 500.

Further, all or a portion of implementations of the present invention can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a digital video stream including a plurality of frames, the method comprising:
   selecting a block of a frame of the plurality of frames, the block being one of a plurality of blocks of the frame;
   performing, using a processor, intra-prediction on the block to calculate a first residual block;
   encoding the first residual block to form an encoded residual block by:
      transforming the first residual block to form a transformed residual block;
      selecting an optimized quantization value for quantizing the transformed residual block, wherein selecting the optimized quantization value comprises:
         for each quantization value of a plurality of quantization values:
            quantizing the transformed residual block using the quantization value to form a quantized first residual block;
            de-quantizing the quantized first residual block to form a transformed second residual block;
            inverse transforming the transformed second residual block to form a second residual block;
            subtracting the second residual block from the first residual block to form a third residual block; and
            calculating a bit cost of the quantized first residual block and the third residual block; wherein the optimized quantization value is based on a comparison of the bit cost for each of the quantization values of the plurality of quantization values; and
         quantizing the transformed residual block to form the encoded residual block using the optimized quantization value;
   entropy coding the encoded residual block to include in an encoded video bitstream;
   decoding the encoded residual block to form a fourth residual block by:
      de-quantizing the transformed residual block to form a de-quantized residual block; and
      inverse transforming the de-quantized residual block to form the fourth residual block;
   subtracting the fourth residual block from the first residual block to form a difference residual block;
   entropy coding the difference residual block to form an encoded difference residual block; and
   including the encoded difference residual block in the encoded video bitstream.

2. The method of claim 1, further comprising:
   adding bits to a header in the encoded video bitstream to indicate that the encoded difference residual block is included in the encoded video bitstream.

3. An apparatus for encoding a video stream including a plurality of frames, comprising:
   a memory; and
   a processor configured to execute instructions stored in the memory to:
      select a block of a frame of the plurality of frames, the block being one of a plurality of blocks of the frame;
      perform intra-prediction on the block to calculate a first residual block;
      encode the first residual block to form an encoded residual block by:
         transforming the first residual block to form a transformed residual block; and
         quantizing the transformed residual block to form the encoded residual block using an optimized quantization value determined by, for each quantization value of a plurality of quantization values:
            quantizing the transformed residual block using the quantization value to form a quantized first residual block;
            de-quantizing the quantized first residual block to form a transformed second residual block;
            inverse transforming the transformed second residual block to form a second residual block;
            subtracting the second residual block from the first residual block to form a third residual block;
            calculating a bit cost of the quantized first residual block and the third residual block; and
            selecting the optimized quantization value to quantize the first residual block based on a comparison of the bit cost for each of the quantization values of the plurality of quantization values;
      entropy code the encoded residual block to include in an encoded video bitstream;
      decode the encoded residual block to form a fourth residual block by:
         de-quantizing the transformed residual block to form a de-quantized residual block; and
         inverse transforming the de-quantized residual block to form the fourth residual block;
      subtract the fourth residual block from the first residual block to form a difference residual block;
      entropy code the difference residual block to form an encoded difference residual block; and
      include the encoded difference residual block in the encoded video bitstream.

4. The apparatus of claim 3 wherein a quantization value is optimized for each respective block of the plurality of blocks.

5. The apparatus of claim 4 wherein the processor is configured to add bits to a header in the encoded video bitstream to indicate that the difference residual block is included in the encoded video bitstream.

* * * * *